(12) United States Patent
Kita et al.

(10) Patent No.: US 10,310,567 B2
(45) Date of Patent: Jun. 4, 2019

(54) ACOUSTIC DEVICE

(71) Applicant: CASIO COMPUTER CO., LTD., Shibuya-ku (JP)

(72) Inventors: Kazunori Kita, Mizuho-machi (JP); Keiichi Imamura, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 1 day.

(21) Appl. No.: 15/659,330

(22) Filed: Jul. 25, 2017

(65) Prior Publication Data
US 2018/0081406 A1    Mar. 22, 2018

(30) Foreign Application Priority Data

Sep. 21, 2016 (JP) ................................. 2016-183610

(51) Int. Cl.
| G06F 1/16 | (2006.01) |
| H04R 1/02 | (2006.01) |
| H04R 1/28 | (2006.01) |
| H04R 1/44 | (2006.01) |
| H04R 9/02 | (2006.01) |

(Continued)

(52) U.S. Cl.
CPC .......... G06F 1/1688 (2013.01); G04C 21/02 (2013.01); G04G 13/00 (2013.01); H04R 1/02 (2013.01); H04R 9/025 (2013.01); H04R 9/06 (2013.01); H04R 9/08 (2013.01); H04R 11/02 (2013.01); G04B 37/0075 (2013.01); H04R 1/028 (2013.01); H04R 1/2842 (2013.01); H04R 1/44 (2013.01); H04R 2499/11 (2013.01)

(58) Field of Classification Search
CPC ........ G06F 1/163; G06F 3/014; G06F 1/1626; G06F 1/1613; G06F 1/1688; H04R 9/06; H04R 1/02; H04R 9/025; H04R 1/2826; H04R 2499/11; H04R 11/02; H04R 1/2849; H04R 1/44; H04R 9/08; G04B 37/0075; G04C 21/02
See application file for complete search history.

(56) References Cited

U.S. PATENT DOCUMENTS

2009/0296979 A1* 12/2009 Kamimura ............... H04R 9/02
381/412

FOREIGN PATENT DOCUMENTS

| JP | 05-042310 | 6/1993 |
| JP | 2000-333290 | 11/2000 |

(Continued)

Primary Examiner — Yogeshkumar Patel
(74) Attorney, Agent, or Firm — Cozen O'Connor

(57) ABSTRACT

An acoustic device includes a waterproof vibrating membrane and a magnetic component disposed below the waterproof vibrating membrane. The waterproof vibrating membrane includes a convex portion which protrudes toward a position of the magnetic component, or a concave portion which is recessed opposing to a position of the magnetic component. The magnetic component includes a concave pressure buffering portion corresponding to a shape of the convex portion of the waterproof vibrating membrane wherein the concave pressure buffering portion is recessed toward a side opposing to a side on which the waterproof vibrating membrane is located, or a convex pressure buffering portion corresponding to a shape of the concave portion of the waterproof vibrating membrane wherein the convex pressure buffering portion protrudes toward a side on which the waterproof vibrating membrane is located.

13 Claims, 10 Drawing Sheets

(51) Int. Cl.
*H04R 9/06* (2006.01)
*H04R 9/08* (2006.01)
*G04B 37/00* (2006.01)
*G04C 21/02* (2006.01)
*G04G 13/00* (2006.01)
*H04R 11/02* (2006.01)

(56) References Cited

FOREIGN PATENT DOCUMENTS

| JP | 2001-300422 | | | 10/2001 | |
|----|----|----|----|----|----|
| JP | 2004-159181 | | | 11/2002 | |
| JP | 2004-159181 | A | * | 6/2004 | ............... H04R 9/10 |
| JP | 2009-044687 | | | 8/2007 | |
| JP | 2008-252237 | | | 10/2008 | |
| JP | 2012-010148 | | | 1/2012 | |

* cited by examiner

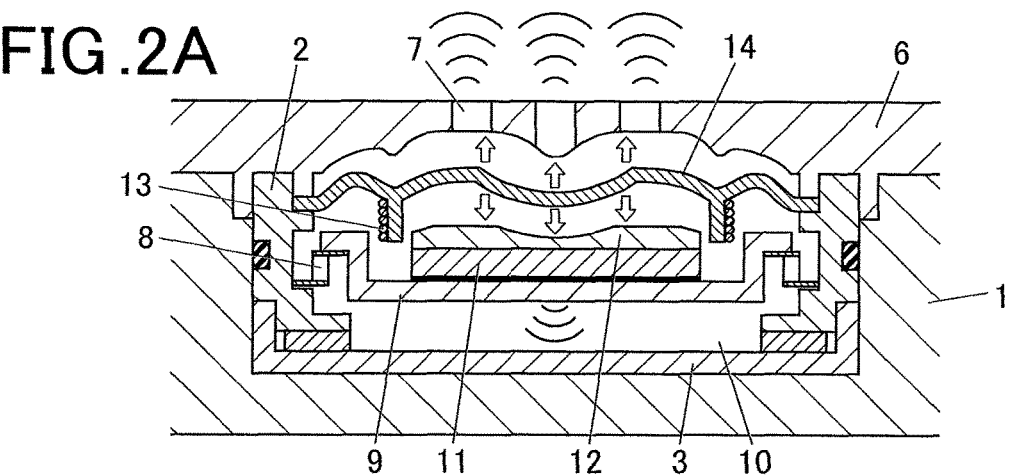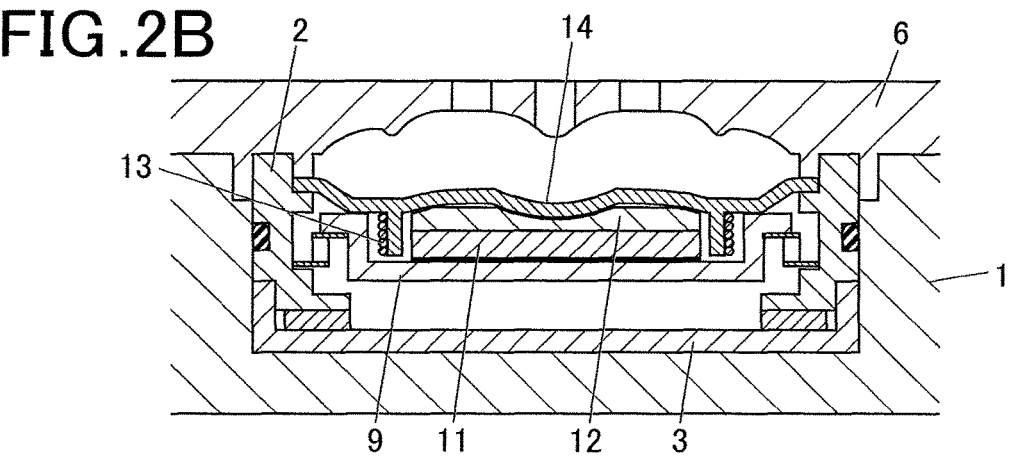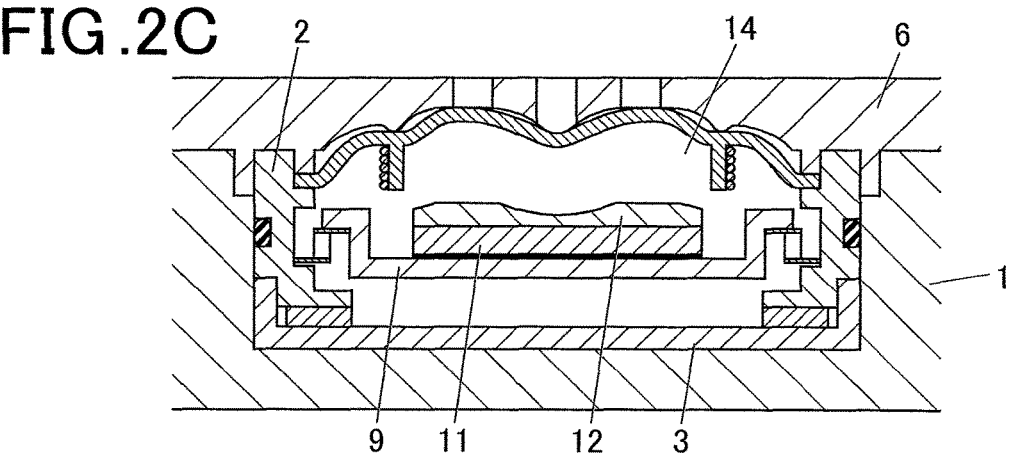

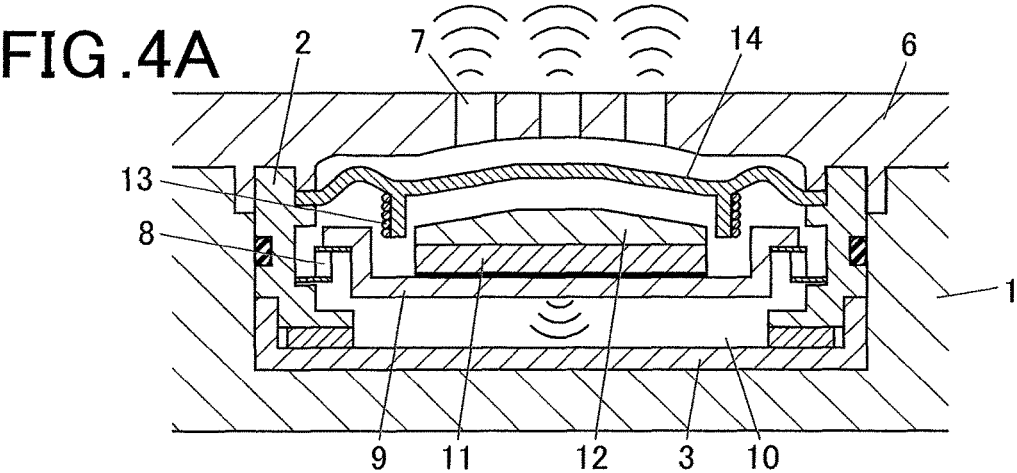
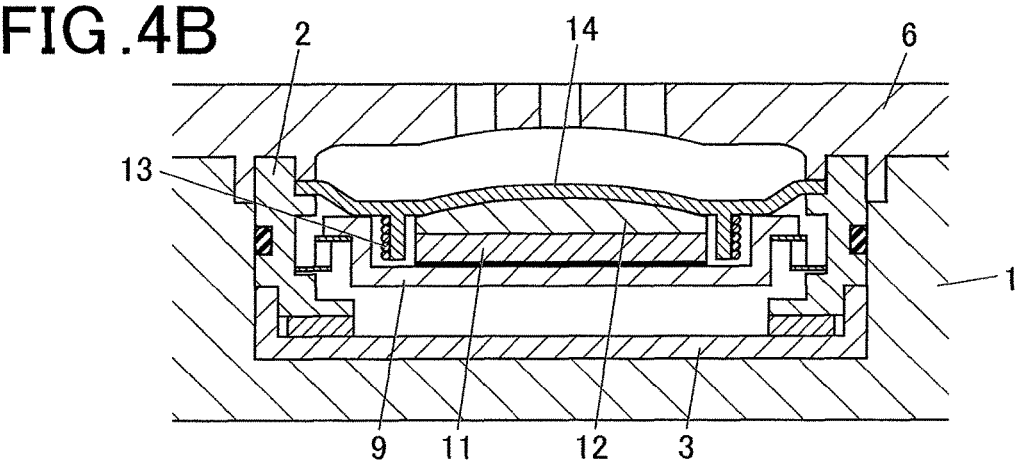
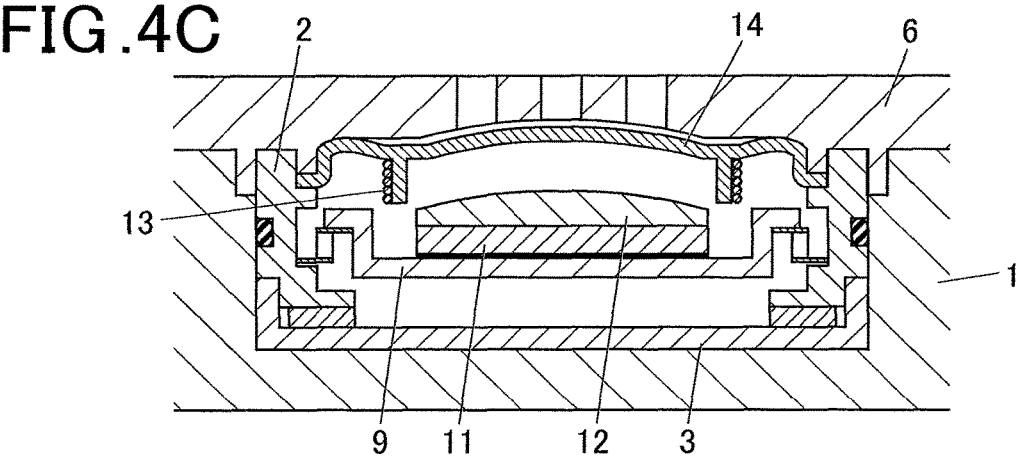

ACOUSTIC DEVICE

CROSS-REFERENCE TO RELATED APPLICATIONS

This application is based upon and claims the benefit of priority under 35 USC 119 of Japanese Patent Application No. 2016-183610 filed on Sep. 21, 2016 the entire disclosure of which, including the descriptions, claims, drawings, and abstract, is incorporated herein by reference in its entirety.

BACKGROUND OF THE INVENTION

1. Field of the Invention

The present invention relates to an acoustic device.

2. Description of Related Art

A loudspeaker which includes a waterproofed vibrating membrane is known as described in JP H05-42310 U.

A microphone which includes an opening-closing member which opens and closes an opening in response to the presence or absence of water droplets detected by a water droplet sensor is known as described in JP 2009-44687 A.

A loudspeaker which includes a vibrating plate formed from a waved waterproof resin diaphragm which is substantially convex outward is known as described in JP 2004-159181 A.

BRIEF SUMMARY OF THE INVENTION

In accordance with one aspect of the present invention, there is provided an acoustic device including:
a waterproof vibrating membrane; and
a magnetic component which is disposed below the waterproof vibrating membrane, the magnetic component including a magnet,
wherein the waterproof vibrating membrane includes a convex portion which protrudes toward a position where the magnetic component is located, or a concave portion which is recessed opposing to a position where the magnetic component is located, and
wherein the magnetic component includes a concave pressure buffering portion corresponding to a shape of the convex portion of the waterproof vibrating membrane wherein the concave pressure buffering portion is recessed toward a side opposing to a side on which the waterproof vibrating membrane is located, or a convex pressure buffering portion corresponding to a shape of the concave portion of the waterproof vibrating membrane wherein the convex pressure buffering portion protrudes toward a side on which the waterproof vibrating membrane is located.

In accordance with another aspect of the present invention, there is provided an acoustic device including:
a waterproof vibrating membrane;
a magnetic component which is disposed below the waterproof vibrating membrane, the magnetic component including a magnet; and
a protection panel which is disposed above the waterproof vibrating membrane, the protection panel including an opening,
wherein the waterproof vibrating membrane includes a convex portion which protrudes toward a position where the magnetic component is located, or a concave portion which is recessed opposing to a position where the magnetic component is located, and
wherein the protection panel includes a convex pressure buffering portion corresponding to a shape of the convex portion at a position corresponding to the convex portion of the waterproof vibrating membrane wherein the convex pressure buffering portion protrudes opposing to a side on which the waterproof vibrating membrane is located, or a concave pressure buffering portion corresponding to a shape of the concave portion at a position corresponding to the concave portion of the waterproof vibrating membrane wherein the concave portion is recessed toward a side on which the waterproof vibrating membrane is located.

In accordance with another aspect of the present invention, there is provided an acoustic device including:
a waterproof vibrating membrane; and
a magnetic component which is disposed below the waterproof vibrating membrane, the magnetic component including a magnet, wherein
the waterproof vibrating membrane includes a convex portion and a concave portion, and
the magnetic component includes a pressure buffering portion which has a shape corresponding to shapes of the convex portion and the concave portion of the waterproof vibrating membrane at positions corresponding to the convex portion and the concave portion of the waterproof vibrating membrane.

BRIEF DESCRIPTION OF THE DRAWINGS

The present invention will become more fully understood from the detailed description given hereinbelow and the appended drawings which are given byway of illustration only, and thus are not intended as a definition of the limits of the present invention, and wherein:

FIG. 2A is a view explaining an operation of the loudspeaker shown in FIG. 1 in normal use;

FIG. 2B is a view explaining an operation of the loudspeaker shown in FIG. 1 when pressure is increased;

FIG. 2C is a view explaining an operation of the loudspeaker shown in FIG. 1 when pressure is decreased;

FIG. 4A is a view explaining an operation of the loudspeaker shown in FIG. 3 in normal use;

FIG. 4B is a view explaining an operation of the loudspeaker shown in FIG. 3 when pressure is increased;

FIG. 4C is a view explaining an operation of the loudspeaker shown in FIG. 3 when pressure is decreased;

DETAILED DESCRIPTION OF THE INVENTION

Hereinafter, embodiments to carry out the present invention will be explained in detail with reference to the drawings.

First Embodiment

Figure 1:
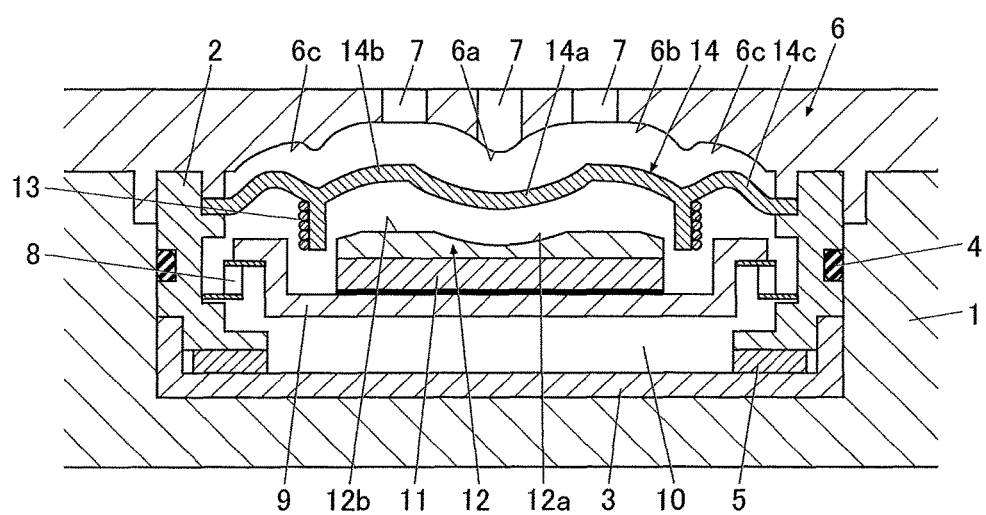
FIG. 1 is a central cross-sectional view of a loudspeaker showing a configuration of an embodiment of an acoustic device to which the present invention applied.

FIG. 1 shows a loudspeaker configured as an embodiment of an acoustic device to which the present invention is applied. A loudspeaker case 2 and a lower case 3 are assembled in a timepiece-side case 1. A waterproof packing 4 such as an O-ring is provided between the timepiece-side case 1 and the loudspeaker case 2. A cushion 5 is provided between the loudspeaker case 2 and the lower case 3.

A protection panel 6 is assembled onto the timepiece-side case 1 and the loudspeaker case 2. A plurality of openings (sound emitting holes) 7 are formed in the protection panel 6.

A yoke 9 is assembled inside the loudspeaker case 2 via springs (leaf springs) 8. A rear cavity 10 is formed between the yoke 9 and the lower case 3.

A pole piece 12 is provided on the yoke 9 via a permanent magnet 11. A voice coil (movable electromagnet) 13 surrounds the outside of the permanent magnet 11 and the pole piece 12. A waterproof vibrating membrane 14 is provided so as to be integrated with the voice coil 13. The waterproof vibrating membrane 14 is supported by the outer circumference thereof being sandwiched between the loudspeaker case 2 and the protection panel 6. In the present embodiment, the magnetic component is formed by the pole piece 12 and the permanent magnet 11.

The center of the waterproof vibrating membrane 14 is formed as a convex portion 14a which protrudes toward the position where the pole piece 12 is located, and the outer circumference of the waterproof vibrating membrane 14 is formed as a concave portion 14b which protrudes toward the position where the protection panel 6 is located opposing to the position where the pole piece 12 is located.

The outer circumference of the waterproof vibrating membrane 14 around the voice coil 13 is also formed as a concave portion 14c which protrudes toward the position where the protection panel 6 is located opposing to the position where the pole piece 12 is located.

In a case where a dynamic loudspeaker element such as an electromagnetic loudspeaker is provided as described above, molding processing to form a smooth convex and concave curved surfaces or the like is carried out in advance on the waterproof vibrating membrane 14 composed of a film, plastic, metal or the like such that the waterproof vibrating membrane 14 has a predetermined acoustic characteristic and/or endurance strength in general.

Pressure buffering portions 12a, 12b are formed on the pole piece 12 at the positions corresponding to the convex portion 14a and concave portion 14b of the waterproof vibrating membrane 14, respectively. That is, the center of the pole piece 12 is formed as a concave pressure buffering portion 12a which is recessed corresponding to the shape of the convex portion 14a, and the surrounding portion is formed as a convex pressure buffering portion 12b which protrudes corresponding to the shape of the concave portion 14b.

Pressure buffering portions 6a, 6b, 6c are formed on the protection panel 6 at the positions corresponding to the convex portion 14a and the concave portions 14b, 14c of the waterproof vibrating membrane 14, respectively. That is, the center of the protection panel 6 is formed as a convex pressure buffering portion 6a corresponding to the shape of convex portion 14a, and the surrounding portions are formed as concave pressure buffering portions 6b, 6c corresponding to the shapes of the concave portions 14b, 14c, respectively.

FIGS. 2A to 2C are views explaining the operation of the loudspeaker. Usually, the loudspeaker emits sound as shown in FIG. 2A.

When pressure is applied to the loudspeaker while the loudspeaker is in water, for example, the external pressure becomes larger than the internal pressure of the loudspeaker, and the waterproof vibrating membrane 14 is pressed onto the pole piece 12 as shown in FIG. 2B. However, owing to the convex and concave curved surfaces composed of the pressure buffering portion 12a having a concave shape at the center of the surface of the pole piece 12 and the pressure buffering portion 12b having a convex shape surrounding the center of the pole piece 12, the molded curved shape of the convex portion 14a at the center of the waterproof vibrating membrane 14 and the concave portion 14b surrounding the center of the waterproof vibrating membrane 14 is protected.

In this way, the surface of the pole piece 12 at the center of the magnetic core which is located inside the waterproof vibrating membrane 14 below the protection panel 6 having the openings 7 which serve as the sound emitting holes is processed so as to have smooth convex and concave curved surfaces such that, when the waterproof vibrating membrane 14 is pressed toward the pole piece 12 which is the lower magnetic core due to water pressure, the waterproof vibrating membrane 14 matches the smooth convex and concave curved surfaces. Thus, convex and concave shapes provided on the waterproof vibrating membrane 14, an edge portion, a damper unit and the like are prevented from being damaged due to mechanical fatigue, and the pressure resistance performance of the waterproof vibrating membrane 14 is improved.

Also, when the internal pressure increases in case where the timepiece is taken out from water, where gas is generated from a battery inside the timepiece, where the air inside the timepiece undergoes thermal expansion due to heat accumulated in a circuit or the like, the external pressure becomes lower than the internal pressure of the loudspeaker, and the waterproof vibrating membrane 14 is pressed toward the protection panel 6 as shown in FIG. 2C. However, the molded curved shape of the convex portion 14a at the center of the waterproof vibrating membrane 14 and the concave portions 14b, 14c around the center of the waterproof vibrating membrane 14 are protected owing to the convex and concave curved surfaces of the pressure buffering portion 6a having a convex shape at the center of the surface of the protection panel 6 and the pressure buffering portion 6b, 6c having a concave shape around the center of the surface of the protection panel 6.

In this way, if the back surface of the upper protection panel 6 is processed such that it has a smooth convex and concave curved surfaces which is a reverse pattern of the pole piece 12, when the waterproof vibrating membrane 14 is pressed toward the protection panel 6 similarly due to negative pressure, the water proof vibrating membrane 14 is not broken easily.

Thereby, the pressure resistance performance of the waterproof vibrating membrane 14 and the water resistance and water proof property of the loudspeaker is reinforced, and the water proof property can be improved to the level for using a reinforced waterproof timepiece case or the like without largely sacrificing the acoustic property.

As described above, in accordance with the loudspeaker of the present embodiment, since the pole piece 12 has the pressure buffering portion 12a having a concave shape corresponding to the shape of the convex portion 14a at the center of the waterproof vibrating membrane 14 and the pressure buffering portion 12b having a convex shape corresponding to the shape of the concave portion 14b at the surrounding position of the waterproof vibrating membrane 14, and the protection panel 6 also has the pressure buffering portion 6a, 6b, 6c similarly having a concave shape or a convex shape, it is possible to prevent the waterproof vibrating membrane 14 from being broken due to pressure change caused by external factors.

Second Embodiment

Figure 3:
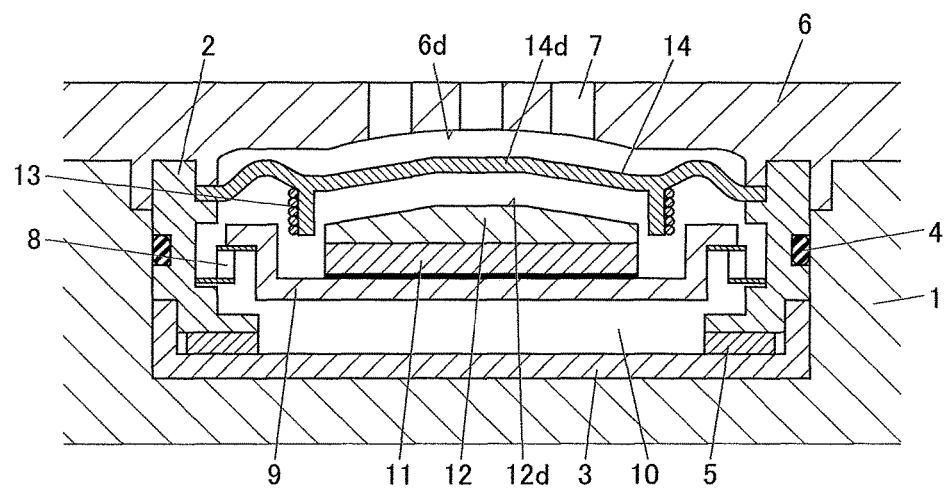
FIG. 3 is a central cross-sectional view of the loudspeaker of the second embodiment.

FIG. 3 shows a loudspeaker of the second embodiment. Similarly to the first embodiment described above, the loudspeaker includes a timepiece-side case 1, a speaker case 2, a lower case 3, a waterproof packing 4, a cushion 5, a protection panel 6, an opening 7, a spring 8, a yoke 9, a rear cavity 10, a permanent magnet 11, a pole piece 12, a voice coil 13 and a waterproof vibrating membrane 14.

In the second embodiment, as shown in the drawing, the major part (the part surrounded by the voice coil 13) of the waterproof vibrating membrane 14 has a concave portion 14d formed so as to protrude toward the protection panel 6 opposing to the position where the pole piece 12 is located.

The upper surface of the pole piece 12 has a pressure buffering portion 12d formed so as to have a convex shape which protrudes corresponding to the shape of the concave portion 14d of the waterproof vibrating membrane 14.

Also, the lower surface of the protection panel 6 has a pressure buffering portion 6d formed so as to have a concave shape which is recessed corresponding to the shape of the concave portion 14d of the waterproof vibrating membrane 14.

Thus, when pressure is applied to the loudspeaker while the loudspeaker is in water, for example, the external pressure becomes larger than the internal pressure of the loudspeaker, and the waterproof vibrating membrane 14 is pressed onto the pole piece 12 as shown in FIG. 4B. However, owing to the convex curved surface of the pressure buffering portion 12d having a convex shape on the surface of the pole piece 12, the molded curved shape of the concave portion 14d of the waterproof vibrating membrane 14 is protected.

Also, when the internal pressure increases in case where the timepiece is taken out from water, where gas is generated from a battery inside the timepiece, where the air inside the timepiece undergoes thermal expansion due to heat accumulated in a circuit or the like, the external pressure becomes lower than the internal pressure of the loudspeaker, and the waterproof vibrating membrane 14 is pressed toward the protection panel 6 as shown in FIG. 4C. However, the molded curved shape of the concave portions 14d of the waterproof vibrating membrane 14 is protected owing to the concave curved surfaces of the pressure buffering portion 6d having a concave shape of the surface of the protection panel 6.

Third Embodiment

Figure 5:
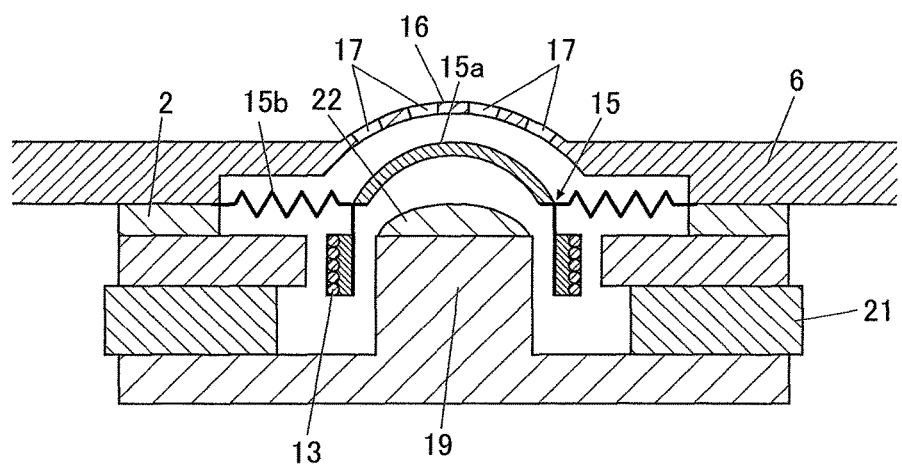
FIG. 5 is a central cross-sectional view of a loudspeaker of the third embodiment.

FIG. 5 shows a loudspeaker of the third embodiment. Similarly to the first embodiment described above, the loudspeaker includes a speaker case 2, a protection panel 6, a voice coil 13, a waterproof vibrating membrane 15, a yoke 19, a permanent magnet 21 and a pole piece 22.

In the third embodiment, as shown in the drawing, the permanent magnet 21 is arranged around the yoke 19 so as to be separated therefrom, and the pole piece 22 is provided on the yoke 19.

The waterproof vibrating membrane 15 is integrated with the voice coil 13 which surrounds the yoke 19 and the pole piece 22 at the center. The waterproof vibrating membrane 15 is constituted by a center cap portion (concave portion) 15a which has a spherical concave shape which is recessed toward the side opposing to the position where the center pole piece 22 is located and an edge portion 15b surrounding the cap portion 15a.

The upper surface of the pole piece 22 is formed as a pressure buffering portion which has a spherical convex shape.

The lower surface of the protection panel 6 is formed as a pressure buffering portion 16 which is recessed corresponding to the spherical convex shape of the outer surface of the spherical concave shape of the center cap 15a. An opening 17 is formed in the spherical portion 16.

By forming the spherical center cap portion 15a at the center of the waterproof vibrating membrane 15, the pole piece 22 which is a pressure buffering piece whose upper surface is a spherical convex portion corresponding to the shape of the center cap portion 15a, and the pressure buffering portion 16 which is the lower surface of the protection panel 6 formed as a spherical concave portion, the advantage can be obtained that the components of the loudspeaker is easily processed in addition to the advantages similar to those of the first and second embodiments.

Forth Embodiment

Figure 6A:
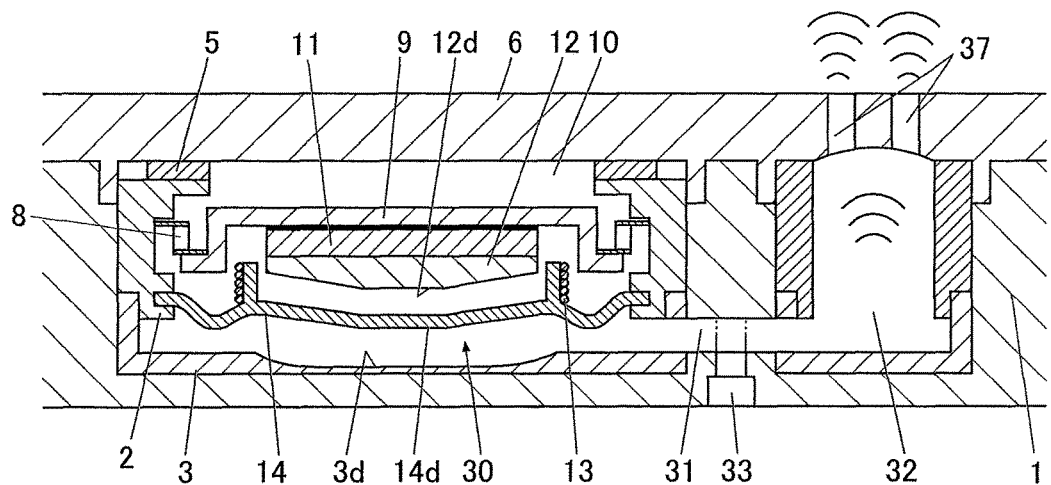
FIG. 6A is a central cross-sectional view of a loudspeaker of the fourth embodiment.
Figure 6B:
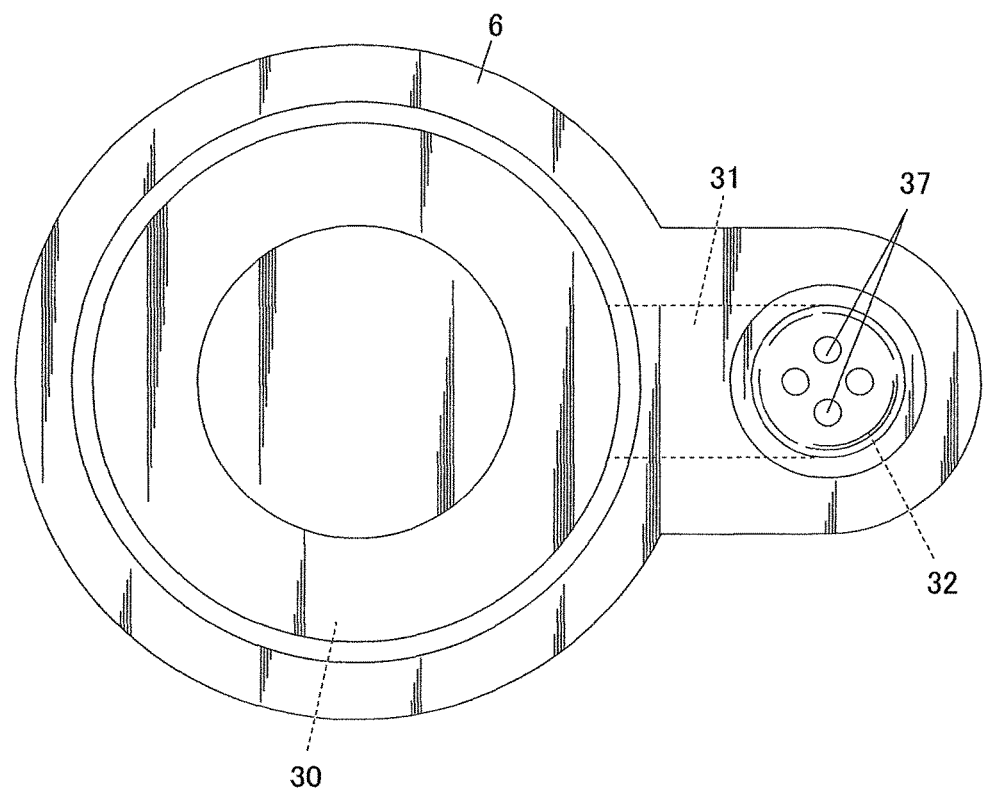
FIG. 6B is a plan view of the loudspeaker of the fourth embodiment.

FIG. 6 shows a loudspeaker of the forth embodiment. FIG. 6A is a center cross-sectional view and FIG. 6B is a plan view. Similarly to the second embodiment described above, the loudspeaker includes a timepiece-side case 1, a speaker case 2, a lower case 3, a cushion 5, a protection panel 6, a spring 8, a yoke 9, a rear cavity 10, a permanent magnet 11, a pole piece 12, a pressure buffering portion 12d, a voice coil 13, a waterproof vibrating membrane 14, and a concave portion 14d.

In the fourth embodiment, as shown in the drawing, the positions of the speaker case 2, the cushion 5, the yoke 9, the rear cavity 10, the permanent magnet 11, the pole piece 12, the voice coil 13 and the waterproof vibrating membrane 14 of the second embodiment are turned upside down. A pressure buffering portion 3d is formed on the upper surface of the lower case 3 so as to be recessed corresponding to the shape of the concave portion 14d of the waterproof vibrating membrane 14.

In a loudspeaker 30 configured as described above, a resonant chamber (Helmholtz resonator) 32 is formed which communicates with a space between the lower case 3 and the waterproof vibrating membrane 14 through an airflow path 31. An opening 37 is provided only in apart of the protection panel 6 which corresponds to the resonant chamber 32.

The loudspeaker 30 such as a dynamic loudspeaker is formed in a small sized cavity such as a small sized cylindrical cavity having a diameter of about 8 mm. The resonant chamber 32 such as a hollow cylindrical pipe having a further smaller diameter of about 3 mm is provided as an entering and exiting path of sound (air) or a sound emitting hole (opening 37) like a chimney or a bass reflex path at the side (or the top) of the loudspeaker 30.

On a way of the airflow path 31, an electromagnetic valve 33 which is slidably driven by an electromagnetic voice coil motor (VCM) or a slidable pin structure including a lubber packing (such as a push button of a watch) to block the air flow path 31 such that the inflow of water (air) or immersion can be passed or blocked in a switchable manner.

When the loudspeaker is determined to be submerged or positioned at a predetermined water depth or more by a submersion sensor (open (in the air) or short (submerged) is detected from electric current or electric resistance between a pair of metal electrodes provided so as to be separated by a few mm to ten mm on the surface of watch case) or a pressure sensor for both air pressure and water pressure (a water depth or a water pressure of a predetermined value or more such as water depth of 1 m to 2 m is detected), this actuator is driven to block the air flow path 31 and to prevent the inflow of air (water) into the cavity of the loudspeaker 30 at pressure resistance of enhanced water resistance level. In the meantime, for example, the audio circuit connected with the loudspeaker 30 is controlled so as not to output to the loudspeaker 30.

When the electromagnetic valve or actuator for blocking the inflow of water is opened, the loudspeaker 30 is water resistant for daily use by itself to resist water pressure about three atmospheric pressures for example. However, the loudspeaker 30 has relatively a good acoustic frequency characteristic in the air.

Also, when the electromagnetic valve or actuator is closed, the loudspeaker cannot be used in water. However, the loudspeaker 30 and the case structure are possible to resist water pressure at enhanced water resistance level about 5 to 10 atmospheric pressures in water or submergence.

In the embodiment described above, the electromagnetic valve 33 which serves as an opening-closing member which opens or closes the airflow path 31 (i) may be constructed as an electromagnetic valve which is integrated with a water resistant push button of a watch, and (ii) may be constructed as an electromagnetic valve which is integrated with a loudspeaker structure of the loudspeaker 30 such as a bass reflex structure. Also, the sensor (iii) may be a submersion (electric resistance, short) sensor or a water pressure (pressure) sensor provided in a body (such as a bezel) or the loudspeaker 30 or built in the body.

Fifth Embodiment

Figure 7:
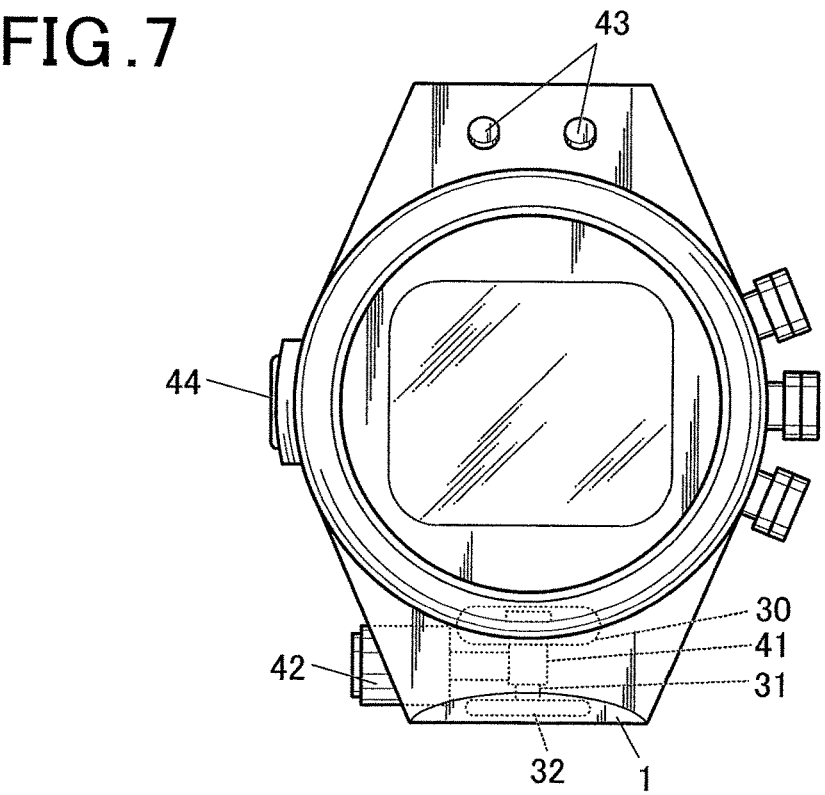
FIG. 7 is a plan view showing an electronic device of the fifth embodiment.

FIG. 7 is a view showing a wrist watch as an electric device according to the fifth embodiment. The wrist watch includes a timepiece-side case 1, a loudspeaker 30, an airflow path 31, a resonant chamber 32, an electromagnetic valve (opening-closing member) 41, an electromagnetic valve driving unit 42, a submersion sensor (electrode) 43 and a water pressure (pressure) sensor 44.

In the fifth embodiment, as shown in the drawing, in the wrist watch in which the loudspeaker 30, the airflow path 31 and the resonant chamber 32 of the forth embodiment is assembled with the timepiece-side case 1, the electromagnetic valve 41 as an opening-closing member which opens and closes the airflow path 31 and the electromagnetic valve driving unit 42 are assembled to the wristwatch and the submersion sensor 43 which detects a submersion state by applied current between a pair of electrodes and the water pressure sensor 44 which detects pressure in water are assembled to the wrist watch.

In this way, by providing the airflow path 31 with the electromagnetic valve 41 which is slidably driven by the electromagnetic valve driving unit 42 by an electromagnetic voice coil motor (VCM), and by opening and closing the airflow path 31, the inflow of water (air) or immersion can be passed or blocked in a switchable manner.

When it is determined that the wrist watch is submerged or at the water depth of a predetermined value or more by the submersion sensor 43 and the pressure sensor 44, the airflow path 31 is blocked to prevent the inflow of water (air) into the cavity of the loudspeaker 30 at pressure resistance of enhanced water resistance level. In the meantime, the audio circuit is controlled so as not to output to the loudspeaker 30.

Sixth Embodiment

Figure 8:
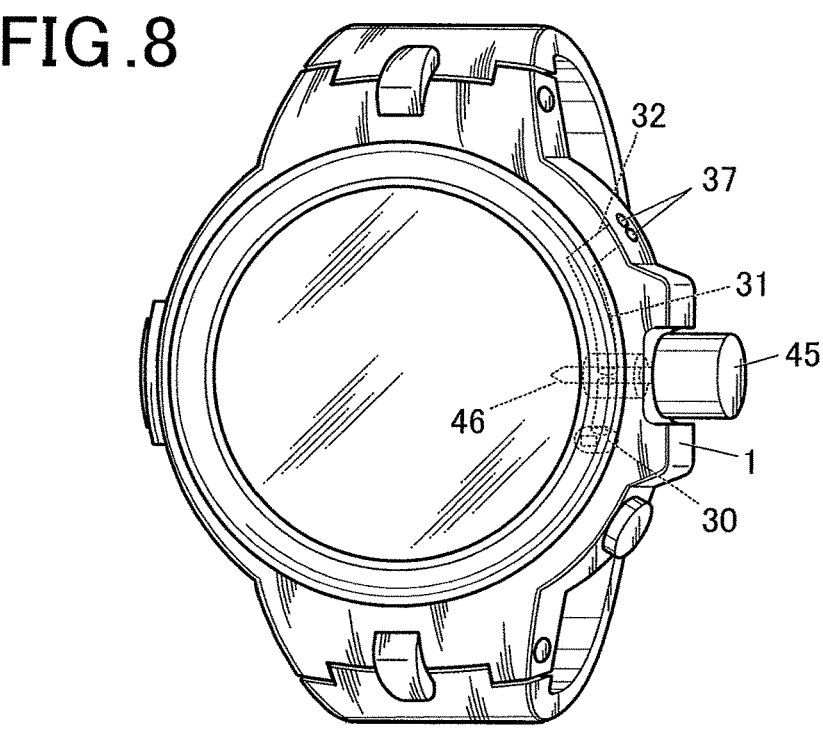
FIG. 8 is a perspective view showing an electronic device of the sixth embodiment.

FIG. 8 shows a wrist watch of the sixth embodiment. The wrist watch includes a timepiece-side case 1, a loudspeaker 30, an airflow path 31, a resonant chamber 32, an opening 37, a winder 45 and a slide pin (opening-closing member) 46.

In the sixth embodiment, as shown in the drawing, the wrist watch in which the loudspeaker 30, the air flow path 31 and the resonant chamber 32 are assembled with the timepiece-side case 1 is provided with the slide pin 46 which is integrated with the winder 45 having a pulling out structure and which is an opening-closing member which opens and closes the airflow path 31.

In this way, the slide pin 46 which is integrated with the winder 45 having the pulling out structure and which includes, for example, a lubber packing is provided in the airflow path 31. By pulling out/pushing in operation of the winder 45 to open and close the airflow path 31, the inflow or immersion of water (air) can be blocked and passed in a switchable manner. In this case, an electromagnetic valve which is an opening-closing member which opens and closes the air flow path 31 as described in the explanation regarding the loudspeaker 30 of the fourth embodiment 4 may not be provided.

Seventh Embodiment

Figure 9:
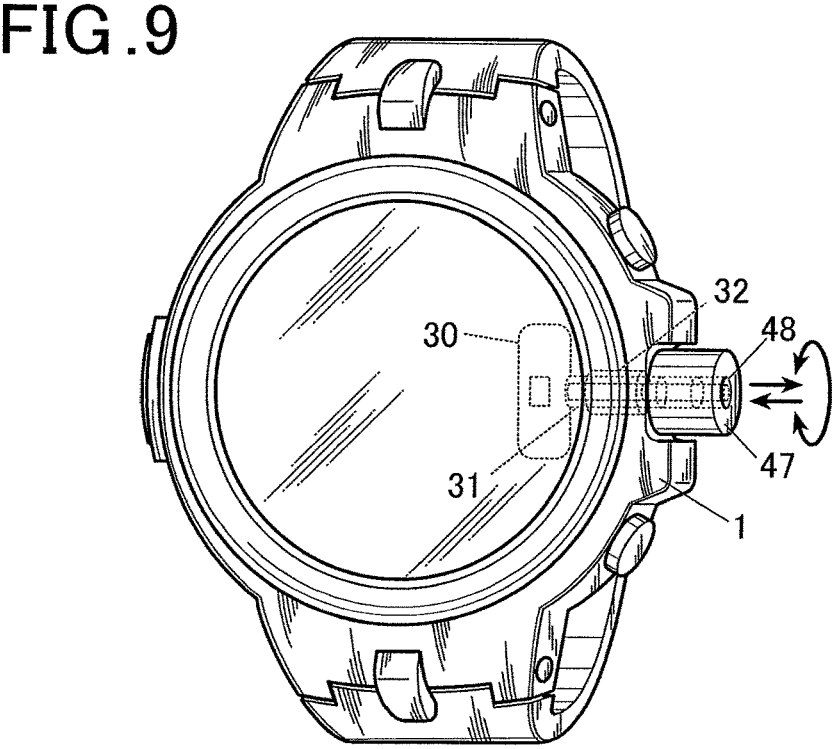
FIG. 9 is a perspective view showing an electronic device of the seventh embodiment.

FIG. 9 shows a wrist watch of the seventh embodiment. The wrist watch includes a timepiece-side case 1, a loudspeaker 30, an airflow path 31, a resonant chamber 32, and a winder 47.

In the seventh embodiment, as shown in the drawing, the wrist watch in which the loudspeaker 30, the airflow path 31 and the resonant chamber 32 of the forth embodiment are assembled with the timepiece-side case 1 is provided with the winder 47 having a pulling out/rotational structure, wherein an airflow path 48 is provided so as to pass through the winder 47.

In this way, the winder 47 having the pulling out/rotational structure is provided with the airflow path 48. By the pulling out/rotational operation of the winder 47, the airflow path 48 passing through the winder 47 is opened to and closed from the resonant chamber 32, and the inflow or immersion of water (air) can be blocked and passed in a switchable manner.

In this case, an electromagnetic valve which is an opening-closing member which opens and closes the air flow path as described in the explanation regarding the loudspeaker 30 of the fourth embodiment 4 may not be provided.

Eighth Embodiment

Figure 10:
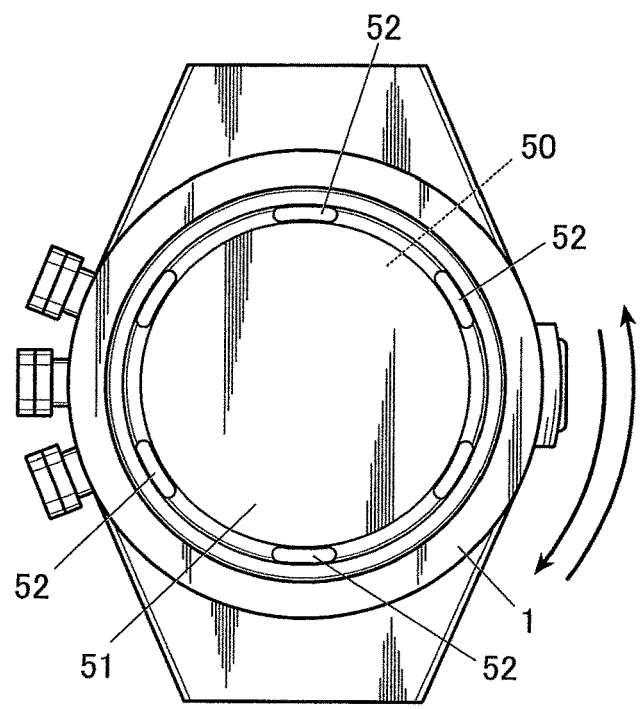
FIG. 10 is a plan view showing an electronic device of the eighth embodiment.
Figure 11:
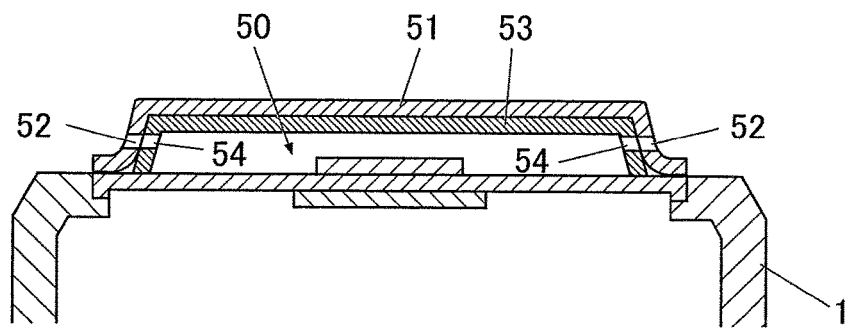
FIG. 11 is a central cross-sectional view of the electronic device shown in FIG. 10.

FIGS. 10 and 11 are a back view and a cross-sectional view of a wrist watch of the eighth embodiment, respectively. The wrist watch includes a timepiece-side case 1, a loudspeaker 50, a back cover 51, an opening 52, an inner cover 53 and an opening 54.

In the eighth embodiment, as shown in the drawings, the loudspeaker 50 is provided on the backside of the timepiece-side case 1, a plurality of slit-like openings 52 are formed in the outer circumference of the back cover 51 which is rotatably attached onto the backside of the timepiece-side case 1, the inner cover 53 is provided inside the back cover 51, and a plurality of slit-like openings 54 are formed in the outer circumference of the inner cover 53. The inner cover 53 is fixed onto the backside of the timepiece-side case 1.

In this way, in the wrist watch in which the speaker 50 is provided on the backside of the timepiece-side case 1, by performing a rotational operation of the back cover 51, the slit-like openings 52 in the outer circumference of the back cover 51 are aligned to or closes the slit-like openings 54 in the outer circumference of the inner cover 53, and the inflow or the immersion of water (air) can be blocked and passed in a switchable manner.

Ninth Embodiment

Figure 12:
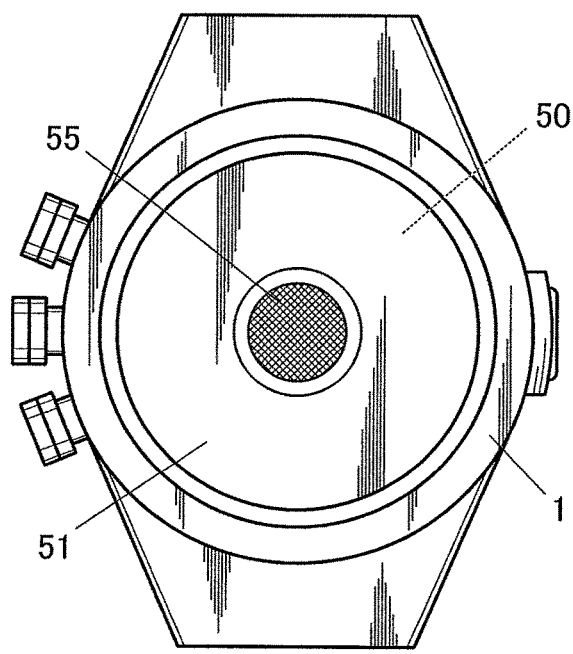
FIG. 12 is a plan view of an electronic device of the ninth embodiment.

FIG. 12 shows the backside of a wrist watch of the ninth embodiment. The wrist watch includes a timepiece-side case 1, a loudspeaker 50, a back cover 51, and a microporous membrane 55.

In the ninth embodiment, as shown in the drawing, the loudspeaker 50 is provided on the backside of the timepiece-side case 1, and the electronically controlled microporous membrane 55 is provided at the center of the back cover 51 which is rotatably attached to the backside of the timepiece-side case 1.

In this way, in the wrist watch in which the loudspeaker 50 is provided on the backside of the timepiece-side case 1, by opening and closing the holes of the microporous membrane 55 provided at the center of the back cover 51, the inflow and immersion of water (air) can be blocked and passed in a switchable manner.

That is, the fine holes of the microporous membrane 55 provided at the center of the back cover 51 of the wrist watch whose timepiece-side case 1 is provided with the loudspeaker 50 is opened and closed by electronic control.

Alternatively, a protective membrane for a vibrating membrane, a waterproof seal or the like to which a circular disc shaped actuator is attached at upper and/or lower position of the vibrating membrane at the opening (entrance and exit hole of air) of the loudspeaker 50 or the airflow path. The actuator includes many fine holes and can electronically increase and decrease the size of the holes (a conductive polymer actuator, an ionic conductive polymer actuator (IPMC) or the like). When a water depth or submersion of a predetermined value or more is detected, the diameter of the actuator is electrically controlled so as to automatically decrease (becomes smaller). Thereby, the inflow of water (air) or the increase of water pressure can be blocked, and the audio circuit can be controlled so as not to output to the loudspeaker.

As described above, (i) an actuator having a membrane structure which opens and closes holes by electronic control may be used, (ii) an actuator which opens and closes fine holes having nanostructures may be used, and (iii) submersion (electric resistance, short) sensor provided in a body (such as a bezel) or a loudspeaker, or water pressure (pressure) sensor built in the body is used to perform control instead of a rainfall sensor.

Tenth Embodiment

Figure 13A:
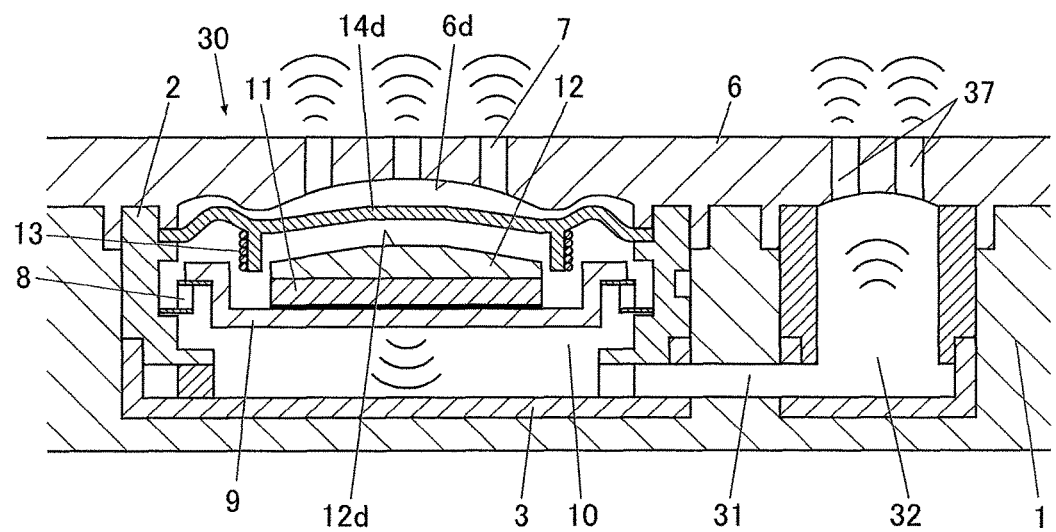
FIG. 13A is a central cross-sectional view of a loudspeaker of the tenth embodiment.
Figure 13B:
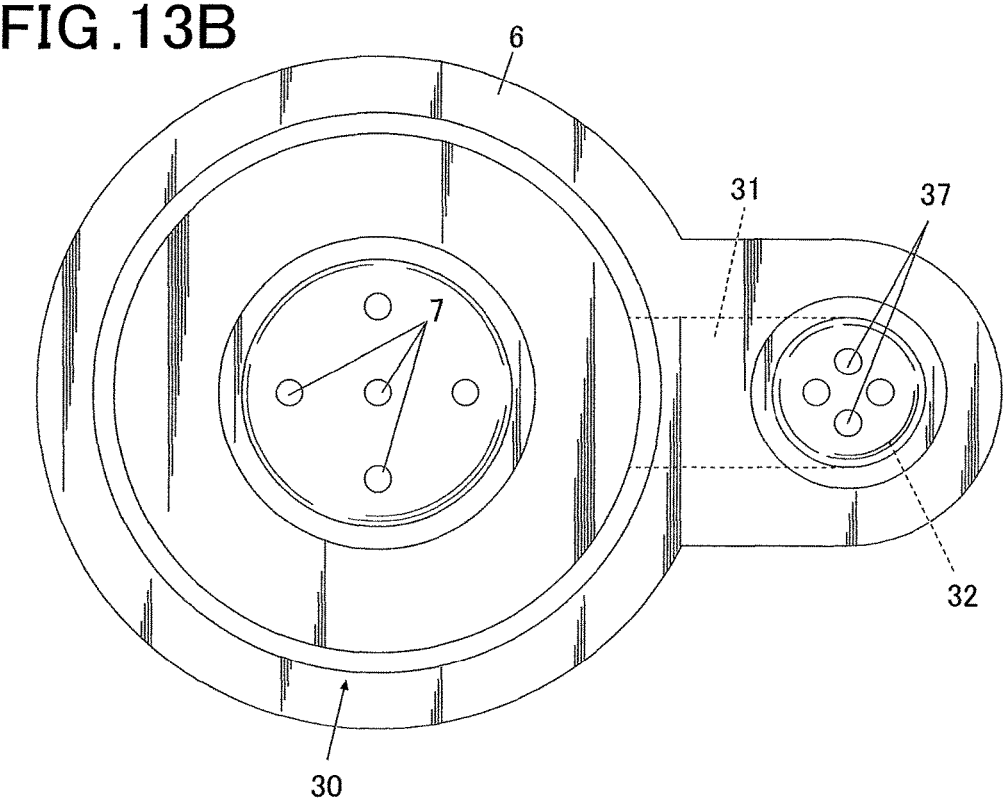
FIG. 13B is a plan view of the loudspeaker of the tenth embodiment.

FIG. 13A is a central cross-sectional view of a loudspeaker of the tenth embodiment, and FIG. 13B is a plan view of the loudspeaker of the tenth embodiment. Similarly to the second embodiment described above, the loudspeaker includes a timepiece-side case 1, a speaker case 2, a lower case 3, a waterproof packing 4, a cushion 5, a protection panel 6, a pressure buffering portion 6d, an opening 7, a spring 8, a yoke 9, a rear cavity 10, a permanent magnet 11, a pole piece 12, a pressure buffering portion 12d, a voice coil 13, a waterproof vibrating membrane 14, and a concave portion 14d. Also, similarly to the forth embodiment described above, the loudspeaker of the tenth embodiment includes a loudspeaker 30, an airflow path 31, a resonant chamber 32 and an opening 37.

In the tenth embodiment, as shown in the drawing, in the loudspeaker 30 configured in a manner similar to the second embodiment, the resonant chamber (Helmholtz resonator) 32 is formed which communicates with the rear cavity 10 between the lower case 3 and the yoke 9 through the airflow path 31. The opening 37 is provided in a part of the protection panel 6 which corresponds to the resonant chamber 32.

By configuring the loudspeaker 30 including the opening 7, the airflow path 31 and the resonant chamber 32 including the opening 37 in this manner, when the loudspeaker is immersed, since water enters the loudspeaker 30 through the opening 7 while water which passes through the opening 37 enters the loudspeaker 30 through the resonant chamber 32, the airflow path 31, the rear cavity 10 and the spring 8, both sides of the waterproof vibrating membrane 14 are immersed. Thus, the differential pressure on the waterproof vibrating membrane 14 due to water pressure can be made smaller. The waterproof vibrating membrane 14 is prevented from being broken, and the acoustic frequency characteristic (bass side) can be improved owing to the resonant chamber 32 in normal use.

In this way, the loudspeaker is configured such that water enter both sides of the waterproof vibrating membrane 14 of the loudspeaker 30 of a flat type (a magneplanar type, a piezoelectric type or the like) at the same time. The water pressures applied on both of the waterproof vibrating membrane 14 are substantially the same in water of the water depth of even about 30 m to 50 m, and the difference in pressure (differential pressure) between both sides becomes smaller. By configuring the loudspeaker such that the waterproof vibrating membrane 14 is prevented from breaking due to water pressure, the water resistance performance of the loudspeaker 30 in water or when submerged can be improved.

The embodiment described above is explained by the configuration in which the pole piece includes a pressure buffering portion. However, in the configuration in which the pole piece is omitted, the shape of the permanent magnet may be processed such that the permanent magnet includes a pressure buffering portion. That is, the magnetic component including a magnet may be configured to include a pressure buffering portion.

Other Embodiment

Although an illustration is omitted, by providing a thin liquid (water, oil, liquid silicone, fluid) layer, a gel layer or the like on the upper part of the waterproof vibrating membrane or the like, the waterproof vibrating membrane is configured to be always a little submerged. Sound can be output through the thin liquid layer even in the air. That is, the loudspeaker structure is configured to be always protected by the liquid layer, and even when the loudspeaker is a little immersed or water pressure is applied, the loudspeaker structure can be configured such that the elements such as vibrating membrane and vibrating plate are little affected.

Modification)

In the embodiments described above, the loudspeakers are described. However, the present invention is not limited thereto. The present invention may be a microphone. That is, the present invention may be an acoustic device.

In addition, it is needless to say that specific detailed structure may be modified as needed.

As described above, some embodiments of the present invention are explained. However, the scope of the present invention is not limited to the embodiments described above, but includes the scope of the invention recited in the claims and the equivalent scope thereof.

What is claimed is:

1. An acoustic device comprising:
a waterproof vibrating membrane; and
a magnetic component which is disposed below the waterproof vibrating membrane, the magnetic component including a magnet,
wherein the waterproof vibrating membrane includes a first central region as a convex portion which protrudes toward a position where the magnetic component is located, and a concave portion surrounding the first central region which is recessed opposing to a position where the magnetic component is located, and
wherein the magnetic component includes a second central region as a concave pressure buffering portion which is recessed corresponding to a shape of the convex portion of the waterproof vibrating membrane wherein the concave pressure buffering portion is recessed toward a side opposing to a side on which the waterproof vibrating membrane is located, and a convex pressure buffering portion surrounding the second central region which protrudes corresponding to a shape of the concave portion of the waterproof vibrating membrane wherein the convex pressure buffering portion protrudes toward a side on which the waterproof vibrating membrane is located.

2. The acoustic device according to claim 1, further comprising a protection panel which is disposed above the waterproof vibrating membrane, the protection panel including an opening, wherein the protection panel includes a third central region as a second convex pressure buffering portion corresponding to a shape of the convex portion of the waterproof vibrating membrane wherein the second convex pressure buffering portion protrudes opposing to a side on which the waterproof vibrating membrane is located, and a second concave pressure buffering portion surrounding the third central region and corresponding to a shape of the concave portion of the waterproof vibrating membrane wherein the second concave pressure buffering portion is recessed toward a side on which the waterproof vibrating membrane is located.

3. An acoustic device comprising:
a waterproof vibrating membrane;
a magnetic component which is disposed below the waterproof vibrating membrane, the magnetic component including a magnet; and
a protection panel which is disposed above the waterproof vibrating membrane, the protection panel including an opening,
wherein the waterproof vibrating membrane includes a first central region as a convex portion which protrudes toward a position where the magnetic component is located, and a concave portion surrounding the first central region which is recessed opposing to a position where the magnetic component is located, and
wherein the protection panel includes a second central region as a convex pressure buffering portion which protrudes corresponding to a shape of the convex portion at a position corresponding to the convex portion of the waterproof vibrating membrane wherein the convex pressure buffering portion protrudes opposing to a side on which the waterproof vibrating membrane is located, and a concave pressure buffering portion surrounding the second central region which is recessed corresponding to a shape of the concave portion at a position corresponding to the concave portion of the waterproof vibrating membrane wherein the concave portion is recessed toward a side on which the waterproof vibrating membrane is located.

4. The acoustic device according to claim 1, further comprising a resonant chamber which resonates with a vibration of the waterproof vibrating membrane.

5. The acoustic device according to claim 3, further comprising a resonant chamber which resonates with a vibration of the waterproof vibrating membrane.

6. The acoustic device according to claim 4, further comprising an opening-closing member which opens and closes an airflow path from a side of the waterproof vibrating membrane to a side of the resonant chamber.

7. The acoustic device according to claim 5, further comprising an opening-closing member which opens and closes an airflow path from a side of the waterproof vibrating membrane to a side of the resonant chamber.

8. The acoustic device according to claim 4, wherein
the resonant chamber is provided with an opening, and
the opening of the protection panel and through the opening of the resonant chamber are configured to pass water.

9. The acoustic device according to claim 5, wherein
the resonant chamber is provided with an opening, and
the opening of the protection panel and through the opening of the resonant chamber are configured to pass water.

10. The acoustic device according to claim 6, wherein
the resonant chamber is provided with an opening, and
the opening of the protection panel and through the opening of the resonant chamber are configured to pass water.

11. The acoustic device according to claim 7, wherein
the resonant chamber is provided with an opening, and
the opening of the protection panel and through the opening of the resonant chamber are configured to pass water.

12. The acoustic device according to claim 1, wherein
the magnetic component is composed of the magnet and a pole piece disposed on the magnet, and
the pole piece includes the pressure buffering portion.

13. An acoustic device comprising:
a waterproof vibrating membrane; and
a magnetic component which is disposed below the waterproof vibrating membrane, the magnetic component including a magnet, wherein
the waterproof vibrating membrane includes a first central region as a convex portion and a concave portion surrounding the first central region, and
the magnetic component includes a second central region as a concave pressure buffering portion which is recessed corresponding to a shape of the convex portion of the waterproof vibrating membrane and a convex pressure buffering portion surrounding the second central region which protrudes corresponding to a shape of the concave portion of the waterproof vibrating membrane.

* * * * *